United States Patent [19]

Keren et al.

[11] Patent Number: 5,355,210
[45] Date of Patent: Oct. 11, 1994

[54] METHOD AND APPARATUS FOR MEASURING OPTICAL PROPERTIES OF OPTICAL DEVICES

[75] Inventors: Eliezer Keren, Arad; Kathi Kreske, Midreshet Ben Gurion; Ami Livnat, Arad, all of Israel

[73] Assignee: Rotlex Optics Ltd., Doar Na Arava, Israel

[21] Appl. No.: 980,072

[22] Filed: Nov. 23, 1992

[51] Int. Cl.$^5$ .............................................. G01B 9/00
[52] U.S. Cl. .................................... 356/124; 356/359
[58] Field of Search ............... 356/124, 125, 127, 359, 356/360

[56] References Cited

U.S. PATENT DOCUMENTS

| | | | |
|---|---|---|---|
| 4,090,790 | 5/1978 | Dragon et al. | 356/125 |
| 5,059,022 | 10/1991 | Ookawa | 356/124 |

Primary Examiner—F. L. Evans
Attorney, Agent, or Firm—Benjamin J. Barish

[57] ABSTRACT

A method and apparatus for measuring an optical property of an optical device, such as a convex or concave reflector surface, by locating a main converging lens having a focal length $f_1$ in front of an optical measuring system capable of measuring collimation, and providing a carrier including an auxiliary converging lens for receiving a beam from the optical measuring system, and the optical device to be tested for reflecting back, via the auxiliary converging lens to the optical measuring system, the beam passed through the auxiliary converging lens from the optical measuring system. The carrier is located at a first position wherein the back focal plane of the auxiliary converging lens coincides with the front focal plane of the main converging lens, and the optical device to be tested is located on the carrier in the front focal plane of the auxiliary converging lens. The carrier is moved to a second position wherein the beam reflected back to the optical measuring system via the auxiliary converging lens and main converging lens is found by the optical measuring system to be collimated.

18 Claims, 3 Drawing Sheets

METHOD AND APPARATUS FOR MEASURING OPTICAL PROPERTIES OF OPTICAL DEVICES

FIELD AND BACKGROUND OF THE INVENTION

The present invention relates to a method and to an apparatus for measuring optical properties of optical devices, particularly spherical specular surfaces and lenses.

The most accurate existing method for testing spherical specular surfaces is illustrated in FIG. 1. Thus, as shown in FIG. 1, a standard interferometric setup, generally designated 2, is used to focus a coherent beam onto the optical surface 3 to be measured. As known, interferometer 2 produces a reference beam and return beam, and measures the phase difference between the two beams. The object 3 can be translated along the optical axis until the interferogram observed on the screen of the interferometer indicates that the beam reflected off the object surface is in phase with the beam reflected off a reference surface, usually referred to as a reference sphere as indicated at 4 in FIG. 1. The optical surface 3 to be measured is first located at the broken line position 3' in FIG. 1 wherein the forward and return beams are in phase, and is then moved, e.g., along an optical rail or table, to the full-line position in FIG. 3 wherein the two beams are again in phase. The distance between these two positions on the optical axis is the radius of curvature of the tested object. Imperfections on the surface of the tested object can be measured from the shape of the distored fringes they produce on the screen in the interferometer 2 when the tested object is in the full-line position of FIG. 1. Thus, the amount of local fringe shifts indicates the surface figure, namely the difference between the actual surface and an ideal sphere measured in waves of the coherent light used by the interferometer.

FIG. 1a illustrates how the existing method is used for measuring concave surfaces, and FIG. 1b illustrates how it is used for measuring convex surface. Thus, when measuring concave surfaces (FIG. 1a), the concave surface, after zeroing the system, is moved away from the interferometer, whereas when measuring convex surfaces it is moved towards the interferometer.

FIG. 2 illustrates the same prior art technique used for testing lenses, as indicated at 5. In this case, a flat mirror 6 is placed in front of the lens 5 to be tested, i.e., away from the interferometer 2. The lens to be tested is first located in the broken-line position illustrated in FIG. 2, corresponding to that of the beam reflected off the back vertex of the lens, and is then moved to the full-line position in FIG. 2 wherein the back focus of the lens coincides with the focusing of the incoming beam. In the latter position, the beam exiting the lens 5 towards the flat mirror 6 is collimated, so that the return beam traces itself exactly to the focal point and into the interferometer 2. The distance between the broken-line and full-line positions of the lens equals the back focal length (BFL) of the test lens 5. Once again, fringe distortions may be used to calculate aberrations and power variations across the lens. Both negative and positive lenses can be tested. Thus, when testing negative lenses, the lens is moved from its zero position away from the interferometer, and when testing positive lenses, it is moved towards the interferometer.

The above traditional method is very accurate, and with proper fringe analysis technology the radius of curvature can be measured to better than 0.1 micrometer. When this resolution is not required, the reflected beam may be analyzed by other techniques for testing beam collimation. Possible alternatives are shearing interferometers, schlieren and other spatial filtering techniques, shadowgraphy, etc. These instruments do not require a reference beam and thus are much less susceptible to noise and vibration as compared to interferometers.

However, the above traditional method suffers from several drawbacks:

1. The range of radii of curvature or focal lengths is limited. When measuring convex surfaces or negative lenses, the object can only be translated towards the converging lens (FIGS. 1 and 2) until they touch. This limits the radius or focal lengths to values smaller than the focal length of the converging lens. Likewise, positive lenses and mirrors cannot be translated beyond the edge of the optical rail or table.

2. The magnification expressed, for example in mm's on the screen to mm's on the object, is not constant but depends on the distance travelled (see FIG. 1).

3. Accurate analysis of the test surface requires proper imaging of the surface onto the observation screen. Failure to do so may introduce undesirable effects, such as diffraction and geometric distortion (namely, an image point may not correspond exactly to its scaled point on the object). For a given optical setup of the detection system, only one position of the object on the rail is optically conjugate to the screen. Objects with different focal lengths are placed in different positions, so that they can all be imaged only if the detection system provides for focusing hardware.

Drawbacks 2 and 3 above may be overcome by recalculating the scale and carefully focusing on each individual object. However, this solution is not practical when fast operation, such as on the production line, is desired.

OBJECTS AND BRIEF SUMMARY OF THE INVENTION

An object of the present invention is to provide a novel method, and also novel apparatus, for measuring optical properties of optical devices, particularly spherical specular surfaces and lenses, having advantages in the above respects.

According to the present invention, there is provided a method of measuring an optical property of an optical device, comprising: locating a main converging lens having a focal length $f_1$ in front of an optical measuring system having means for measuring collimation of a beam; providing a carrier having an auxiliary converging lens for receiving a beam from the optical measuring system, and means, including the optical device to be tested, for reflecting back, via the auxiliary converging lens to the optical measuring system, the beam passed through the auxiliary converging lens from the optical measuring system; locating said carrier at a first position wherein the back focal plane of the auxiliary converging lens coincides with the front focal plane of the main converging lens; locating said optical device to be tested on said carrier in the front focal plane of the auxiliary converging lens; and moving the carrier to a second position wherein the beam reflected back to the optical measuring system via the auxiliary converging lens and main converging lens is found by said optical measuring system to be collimated.

When the optical device is a spherical surface, the distance ($\Delta Z$) between the first and second positions is measured, and the curvature ($C=1/R$) of the optical device to be tested is determined by the following equation:

$$C = \Delta Z / f_0^2$$

wherein $f_o$ is the focal length of the auxiliary converging lens, the power ($P_o$) of this lens being equal to $1/f_o$. It will be seen that radii up to infinity may be measured, both with respect to convex surfaces and concave surfaces, the C and $\Delta z$ changing signs in the latter cases.

According to a preferred described embodiment, the location of the auxiliary converging lens at the first position wherein the back focal plane of the auxiliary lens coincides with the focal plane of the main converging lens, is verified by placing a flat mirror after the auxiliary converging lens and receiving a reference pattern.

The novel method may also be used for measuring lenses (having a focal length f), in which case the mentioned first position is found as before with the mirror at a small distance in front of the front focal plane of the auxiliary converging lens. The lens to be tested is then placed at the front focal plane of the auxiliary lens and moved, together with the mirror, and the auxiliary lens, to the second position where a reference pattern is again observed. The lens power ($P=1/f$) of the optical device is determined by the following equation:

$$P = \Delta Z / f_0^2$$

The invention also provides apparatus for measuring optical properties of optical devices in accordance with the above method.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Overall Method and System

The invention is described below, for purposes of example, with respect to one particular type of optical measuring system, namely a moire deflectometer, which is a ray tracing alternative to interferometry. It is based on the moire effect, a phenomenon that causes a moire fringe pattern to appear when two gratings, in this case two square wave gratings, interfere. When there is a small angle between the gratings, a moire pattern of straight reference fringes is observed perpendicular to the gratings' stripes. A schematic of a telescopic moire deflectometer system can be seen in FIG. 3. The two gratings $G_1$, $G_2$ are placed a distance apart to increase sensitivity. After reflecting off the test surface and returning through the telescope, the beam passes through the first grating and projects a shadow of the first grating on the second grating. If the beam is collimated, the shadow of the first grating will be identical to the second grating, and straight reference fringes will be observed. If there are wavefront distortions in the beam, the shadow will not be identical, producing fringes that are wavy, distorted, or at an angle to the reference fringes.

It will be appreciated, however, that a moire deflectometer is but one example of a type of optical measuring system which can be used, and that other optical measuring systems, including various forms of interferometers, could also be used.

Figure 1A:
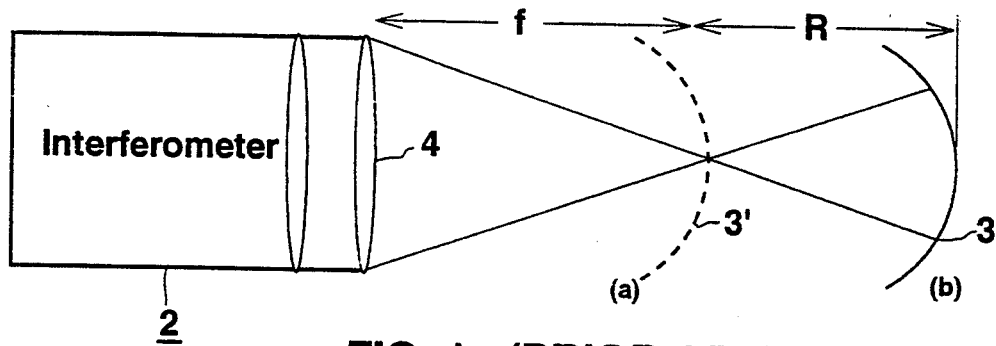
FIGS. 1a, 1b and 2 are diagrams illustrating the existing method for testing specular surfaces and lenses as described above.
Figure 1B:
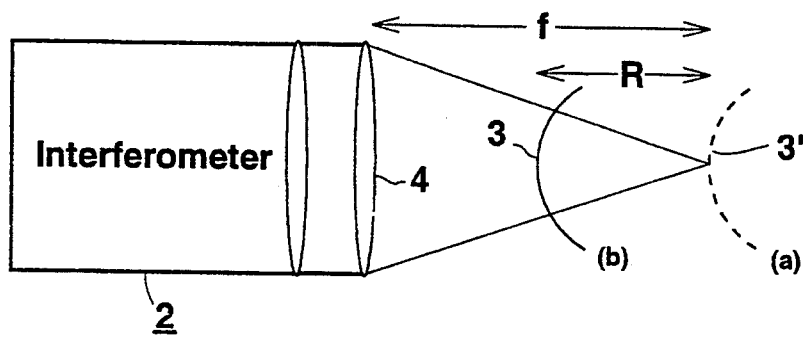
Figure 2:
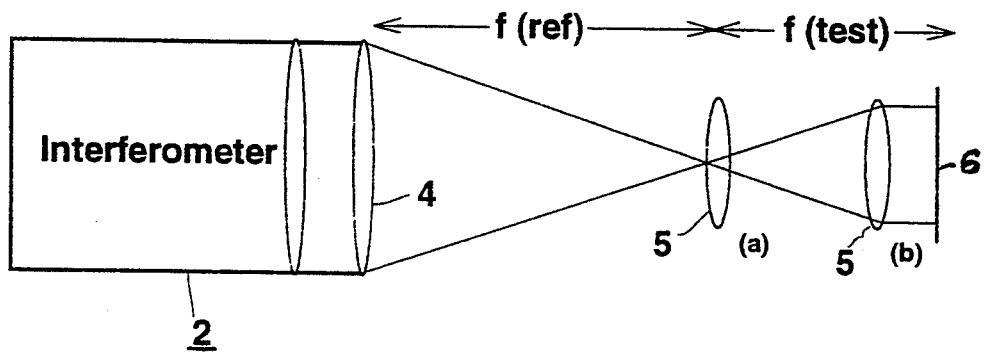
Figure 3A:
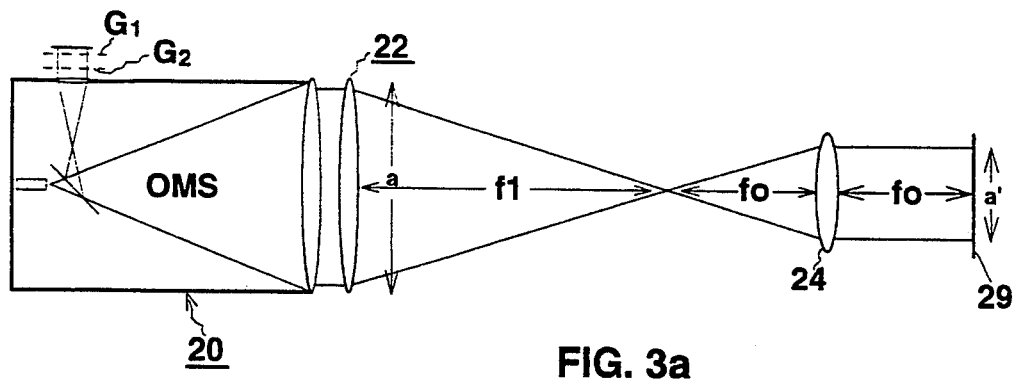
FIGS. 3a and 3b are diagrams illustrating a new method for testing a specular surface in accordance with the present invention.
Figure 3B:
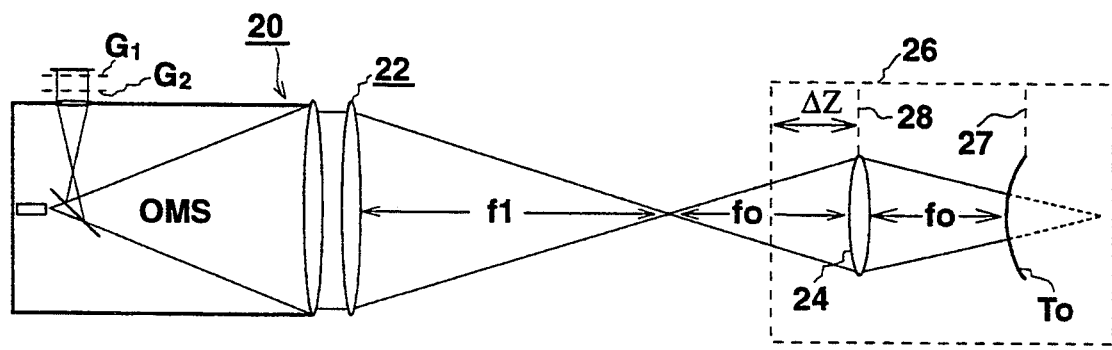

FIG. 3b illustrates a basic system for measuring a spherical surface in accordance with the present invention, while FIG. 3a is a diagram helpful in explaining the basic concept of the novel method.

Thus, as shown in FIG. 3b, the method utilizes an optical measuring system, a moire deflectometer in this example generally designated 20, having means for producing a forward beam and for measuring the return beam by comparing the fringe pattern thereof to a reference pattern. A main converging lens system 22 is located in front of the optical measuring system 20 and has a focal length indicated as $f_1$. An auxiliary converging lens 24 is located in front of the main converging lens 22 and has a focal length $f_0$. As shown in FIG. 3b auxiliary lens 24 is located such that its back focal plane coincides with the front focal plane of the main converging lens 22.

The auxiliary converging lens 24 is carried by a movable common support, schematically indicated at 26, such as an optical table or rail, which also carries a holder, schematically indicated at 27, for locating the test surface of the test object TO at the front focal plane of the auxiliary lens 24. The common support also includes a holder 28 for the auxiliary converging lens 24, such that both the auxiliary lens 24 and the test object TO travel together with their common support 26.

As shown in FIG. 3a, if the test object TO is a flat mirror located at the front focal plane of the auxiliary lens 24, the output beam from the auxiliary lens would be collimated when the auxiliary lens is located with its back focal plane coinciding with the front focal plane of the main converging lens 22. This position of the auxiliary lens 24 is the reference or zero position. In this position, a reference fringe pattern will be observed.

However, when the test surface is convex, as shown by object TO in FIG. 3b, the beam returned to the auxiliary lens 24 is no longer collimated, so that the beam returned to the optical measuring system will no longer be in phase with the forward beam. This will be observed in the optical measuring system 20. The test object TO, together with the auxiliary lens 24 mounted on the common support 26, is then moved away from the optical measuring system 20 until the beam returned via the auxiliary lens 24 and converging lens 22 to the optical measuring system 20 is again collimated and produces a reference fringe pattern. The distance moved by the auxiliary lens 24 and test object TO for this purpose is indicated as $\Delta Z$ in FIG. 3.

It will thus be seen that from the diagram of FIG. 3b, that in the balance position, namely the position where the return beam traces itself exactly and produces reference fringes in the optical measuring system 20, the center of curvature of the test object TO is the optical image of the point source at the focus of the converging lens 22. Newton's thin lens formula may then be used:

$$x_1 x_2 = -f_0^2$$

where $f_0$ is the focal length of the auxiliary lens, $x_1$ is the distance between the object and its first focal point, and $x_2$ is the distance between the image and the second focal point.

From FIG. 3b it is seen that $x_1$ equals $\Delta z$, the distance travelled between the reference position (as in FIG. 3a), and the balanced position with the object. The radius of curvature R equals $x_2$. Thus, $$R\Delta z = f_0^2$$
$$C = 1/R$$
$$C = \frac{\Delta z}{f_0^2}$$

This is the working equation of the described method.

Thus, in contrast with the traditional method, where $\Delta z$ equals R, here $\Delta z$ is proportional to the curvature $C = 1/R$. Clearly, large radii up to infinity may be tested. The same formula applies to concave surfaces, with both C and $\Delta z$ changing signs.

Figure 4:
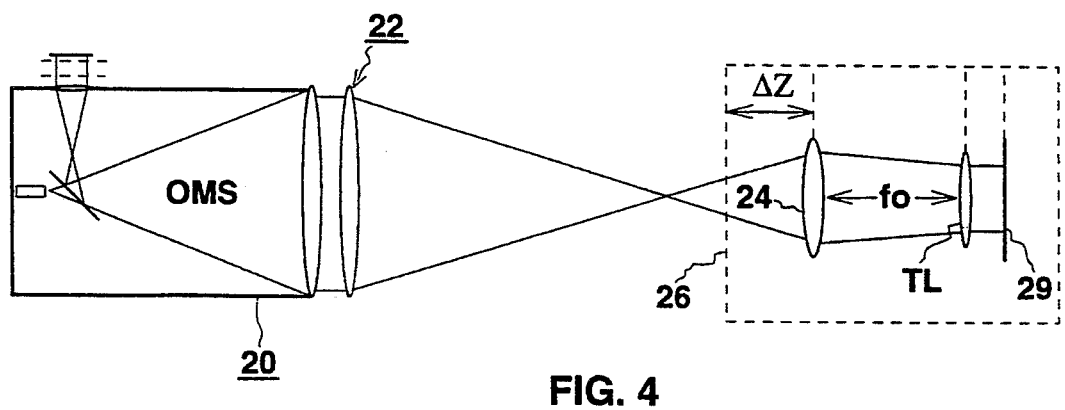
FIG. 4 is a diagram illustrating a method of testing a lens in accordance with the present invention.

FIG. 4 shows how this method can also be used for testing a lens, as shown at TL. The lens TL placed next to a flat mirror 29 at the front focal plane of the auxiliary lens 24. The lens power $P = 1/f$ replaces the curvature C in the working equation. The zero position is the same. The test lens is placed between the auxiliary lens 24 and the mirror 29 in the front focal plane of the auxiliary lens. If the test lens is positive, the auxiliary lens, test lens, and mirror are translated towards the optical measuring system 20.

It can be proved that the proposed system maintains optical imaging irrespective of the measurement object. Thus, when the object is placed in the focal plane of the auxiliary lens, each point source on the front focal plane produces a collimated beam incident on the converging lens. The detection system must be aligned so that this collimated beam is focused onto a single point on the observation screen. Since each point on the object produces a collimated beam irrespective of the radius of curvature, it will be imaged onto a single point on the screen, achieving conditions for imaging. Note that translation of the auxiliary lens and object does not change the ray traces within the optical measuring system 20 (see FIG. 5).

The magnification can be calculated as follows: Since the ray traces within the detection system are identical in FIGS. 3a and 3b, it is sufficient to evaluate the magnification between the object aperture a' and the entrance pupil a. In the reference position (FIG. 3a), the magnification is calculated from similar triangles, $$\frac{a}{a'} = \frac{f_1}{f_0}$$

where $f_1$ is the focal length of the converging lens and $f_0$ is the focal length of the auxiliary lens. In FIG. 3b this operation is performed twice, $$\frac{a}{a'} = \frac{f_1}{f_0 + \Delta Z} \times \frac{f_0 + R}{R} = \frac{f_1}{f_0} \frac{(1 + f_0/R)}{(1 + \Delta z/f_0)}$$

In the balanced position, the two terms in parentheses cancel (see working equation), leaving the R independent result $f_1/f_0$.

It will thus be seen that positioning the object in the front focal plane of the auxiliary lens achieves the following:

1. The distance travelled between the reference and balanced position is proportional to the power or curvature.
2. When the balanced position is reached, the object area is imaged onto the screen.
3. The scale or magnification on the screen is object independent.

Operation

Figure 5:
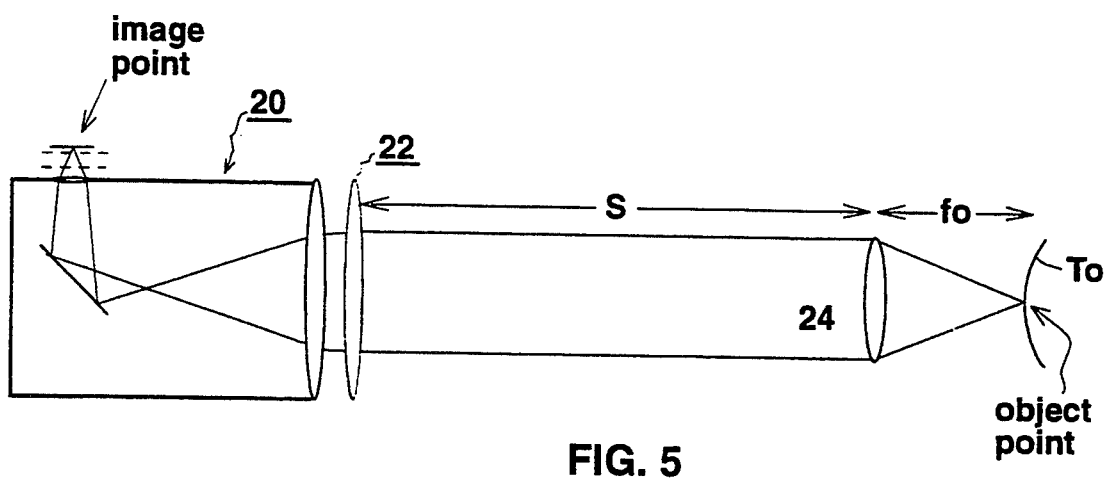
FIGS. 5 and 6 are diagrams helpful in explaining the operation of the illustrated system.
Figure 6:
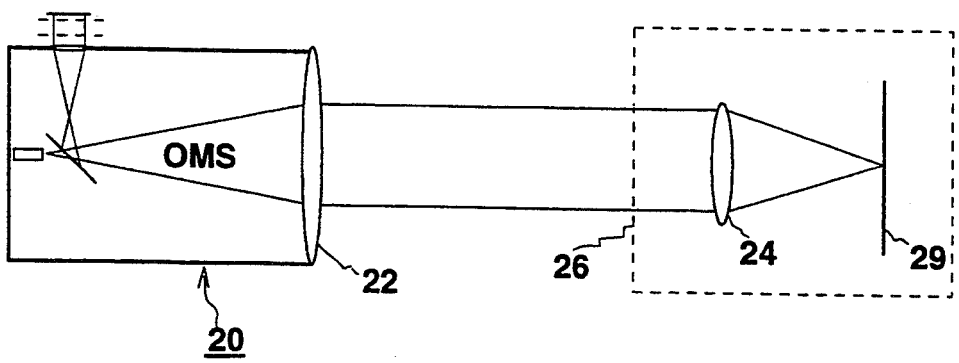

The manner of using the illustrated system will now be described, particularly with reference to FIGS. 5 and 6.

1. The detection system 20 (deflectometer, interferometer, etc.) is aligned to produce reference fringes with a flat mirror (e.g., 29, FIG. 3a) and without the converging lens 22 and auxiliary lens 24.

2. The auxiliary lens 24 is placed on the object mount 26 together with the flat mirror 29, with its primary focus facing the detection system 20, and its infinite (front) side facing the mirror. The converging lens 22 is still unmounted.

3. The object mount 26 is designed to translate both the auxiliary lens 24 and object TO (FIG. 3b) while retaining a constant separation (equal to $f_0$) between them. This separation may be attained by unlocking the mirror and sliding it on the mount relative to the auxiliary lens until the beam incident on the mirror is exactly focused on the surface (FIG. 6). This is verified by observing reference fringes on the screen. The mirror is locked, and from now on it moves together with the auxiliary lens.

4. The converging lens 22 is mounted, and the object mount 26 holding both the auxiliary lens 24 and mirror 29 is translated along the rail until both lenses are conofocal (FIG. 3b). The exact position is once again indicated by observing reference fringes. This rail position is the reference point for measurements. When an electronic position readout is available, this point is set to zero.

5. When measuring a spherical specular surface, the flat mirror is removed and the test surface replaces it so that its vertex (the point on the optical axis) lies flush with the focal plane (FIG. 5), where the flat mirror was before. The system should have means of verifying this position, especially when small radii are measured (see below for sensitivity to misplacement). When no such means achieve the desired accuracy, steps 2 and 3 may be repeated with the test surface replacing the flat mirror.

6. When measuring a lens, steps 2 and 3 are performed with the test object replacing the flat mirror. An infinite conjugate lens should be placed so that its infinite side faces the mirror. If the auxiliary lens is focused on the back surface, the back focal length will be measured. The flat mirror is placed as close as possible to the test object, and in parallel to it. As in step 5, when the test object is replaced, the system should have means of verifying that the back surface of the new test object lies flush with the focal plane of the auxiliary lens, especially when larger powers are measured.

7. The object mount is translated until reference fringes ale recovered, to show that the forward and return beams are in phase. The radius of curvature or focal length is calculated from the working equation using the measured distance.

Error Analysis

The working equation was derived using thin lens formulas and paraxial optics. The auxiliary lens 24 must be a good lens with minimum aberrations (at infinite conjugates), so that the measured fringes indicate imperfections in the test object rather than in the measuring optics. This requirement dictates the use of a multi element thick lens. The alignment procedure (step No. 3) ensures that the object lies in the front focal plane of the auxiliary lens, even when it is thick. The working equation still holds when this condition is satisfied. Exact spheres require a single parameter R, which can be measured near the axial area even when off axis areas of the interferogram exhibit aberrations of the measuring optics. Variations in power outside the axis are measured accurately when the focal length or radius or curvature is large. In this case, all rays are nearly paraxial and the auxiliary lens operates near its nominal infinite conjugate ratio. As the measured power is increased, the lens departs from its optimum conjugate ratio and aberrations may appear off axis. When this feature imposes a problem, it can be overcome by designing a set of interchangeable lenses, each optimized for a limited range of conjugate ratios. For example, one lens covers large positive powers, a second covers large negative powers, and a third for small powers (positive and negative). This arrangement is similar to the range of lenses for near, medium, and far objects in photography. The lenses designed for large powers may have shorter focal lengths, to allow a wider range of powers to be measured.

Another error that may appear with large powers is non-linearity between $\Delta z$ and C in the working equation due to failure of the paraxial approximation. The new method can still be used at small radii if the following procedure is adopted. Spherical mirrors with various (small) radii of curvature R are measured by the traditional method described in the introduction. The displacements $\Delta z$ are then measured with the new method for each of the spherical mirrors. A graph of C vs. $\Delta z$ is constructed, serving as a calibration curve to be used instead of the working equation. The calibration procedure is recommended also for the linear region, in case $f_0$ appearing in the working equation is not known to sufficient accuracy.

Let $\delta_z$ be the error in measuring $\Delta z$. This error may result from the optical rail precision, from fringe resolution in the interferogram/deflectogram, or a combination thereof. The error $\delta C$ in measuring the curvature is, $$\delta C = \frac{1}{f_0{}^2} \delta z$$

and the error in radius of curvature is, $$\delta R = R^2 \delta C = \frac{R^2}{f_0{}^2} \delta z$$

If only this source of error were present, the traditional method would be more acurate than the new method when $R > f_0$ (or $P < P_0$), and less accurate when $R < f_0$ (or $P > P_0$). In practice, however, measuring small R (or large P) with the new method will be hampered by optical errors described above, while the traditional method cannot measure radii longer than its working distance.

It is tempting to reduce the error of the present system by increasing the focal length $f_0$ of the auxiliary lens. But, there is both a practical and theoretical limit to the maximum value of $f_0$. In practice it is not advisable to use an $f_0$ longer than the highest measured R. In the case of convex objects (FIG. 3b), the measured area decreases with the ratio $$\frac{R}{R + f_0}$$

In the case of concave objects, moving the auxiliary lens in FIG. 3a to the left by more than $f_0$ will cause the incoming beam to focus beyond the lens. In this arrangement the auxiliary lens operates contrary to its intended image conjugation, introducing aberrations and possible violations of the paraxial-thin lens approximations leading to the working equation.

This will be the same for measuring power, where large positive power will cause the same problems as small concave radii, and large negative powers can be compared with small convex radii.

The theoretical constraint is imposed by the diffraction limit which expresses the sensitivity of the detection system to defocusing $\Delta z$, $$W = \frac{k \delta z}{\lambda f_{n0}}$$

where W is the wavefront distortion expressed in fringe shift, $f_{n0} = f_0/a$ is the f-number of the lens, $\lambda$ is the wavelength of the light, and k is a dimensionless factor involving the fraction of a fringe that can be resolved by the interferometer. A similar expression with a somewhat different value of k applies to the moire deflectometer. As long as the precision of $\Delta z$ is determined by the rail readout, increasing $f_0$ indeed improves the accuracy of the R measurement. When $f_0$ reaches a value where W gets below the systems ability to detect a fringe shift, the accuracy will no longer change because both $\delta R$ and W depend on $f_0$ in the same fashion.

The design of the auxiliary lens is a trade-off among various requirements such as the range of measured radii, the need to operate over a wide range of conjugate ratios, and achieving maximum precision subject to the resolutions of the rail and the system.

While the invention has been described with respect to one preferred embodiment, it will be appreciated that this is set forth merely for purposes of example, and that many other variations, modifications and applications of the invention may be made.

What is claimed is:

1. A method of measuring an optical property of an optical device, comprising:
   locating a main converging lens having a focal length $f_1$ in front of an optical measuring system having means for measuring collimation of a beam;
   providing a carrier having an auxiliary converging lens for receiving a beam from the optical measuring system, and means, including the optical device to be tested, for reflecting back, via the auxiliary converging lens to the optical measuring system, the beam passed through the auxiliary converging lens from the optical measuring system;

locating said carrier at a first position wherein the back focal plane of the auxiliary converging lens coincides with the front focal plane of the main converging lens;

locating said optical device to be tested on said carrier in the front focal plane of the auxiliary converging lens;

and moving the carrier to a second position wherein the beam reflected back to the optical measuring system via the auxiliary converging lens and main converging lens is found by said optical measuring system to be collimated.

2. The method according to claim 1, wherein the first position at which the auxiliary converging lens is located in front to the main converging lens is verified by placing a flat mirror after the auxiliary converging lens and receiving a reference pattern, which reference pattern is again observed when the carrier is in said second position.

3. The method according to claim 1, wherein the optical device to be tested is a convex reflector surface and is moved together with the auxiliary converging lens away from the main converging lens.

4. The method according to claim 1, wherein the optical device to be tested is a concave reflector surface, and is moved together with the auxiliary converging lens towards the main converging lens.

5. The method according to claim 1, wherein the distance ($\Delta Z$) between said first and second positions is measured, and the curvature (C) of the optical device to be tested is determined, by the following equation:

$$C = \Delta Z / f_o^2$$

wherein $f_o$ is the focal length of said auxiliary converging lens.

6. The method according to claim 1, wherein the distance ($\Delta Z$) between said first and second positions is measured, the optical device to be tested is a lens having a focal length (f); said reflector means includes a flat mirror in front of and parallel to the lens to be tested and is moved with the optical device and auxiliary converging lens from said first position to said second position; and the lens power (P) of the optical device is determined by the following equation:

$$P = \Delta Z / f_0^2$$

wherein $f_o$ is the focal length of said auxiliary converging lens.

7. The method according to claim 1, wherein said optical measuring system is a deflectometer.

8. The method according to claim 1, wherein said optical measuring system is an interferometer.

9. A method of measuring an optical property of an optical device, comprising:

locating a main converging lens having a focal length $f_1$ in front of an optical measuring system having means for measuring collimation of a beam;

providing a carrier having an auxiliary converging lens for receiving a beam from the optical measuring system, and means, including the optical device to be tested, for reflecting back, via the auxiliary converging lens to the optical measuring system, the beam passed through the auxiliary converging lens from the optical measuring system;

locating said carrier at a first position wherein the back focal plane of the auxiliary converging lens coincides with the front focal plane of the main converging lens;

locating said optical device to be tested on said carrier in the front focal plane of the auxiliary converging lens;

moving the carrier to a second position wherein the beam reflected back to the optical measuring system via the auxiliary converging lens and main converging lens is found by said optical measuring system to be collimated;

measuring the distance ($\Delta Z$) between said first and second positions;

and determining the curvature (C) of the optical device to be tested by the following equation:

$$C = \Delta Z / f_o^2$$

wherein $f_o$ is the focal length of said auxiliary converging lens.

10. The method according to claim 9, wherein said first position at which the auxiliary converging lens is located in front to the main converging lens is verified by placing a flat mirror after the auxiliary converging lens and receiving a reference pattern, which reference pattern is again observed when the carrier is in said second position.

11. The method according to claim 9, wherein the optical device to be tested is a convex reflector surface and is moved together with the auxiliary converging lens away from the main converging lens.

12. The method according to claim 9, wherein the optical device to be tested is a concave reflector surface, and is moved together with the auxiliary converging lens towards the main converging lens.

13. The method according to claim 9, wherein the distance ($\Delta Z$) between said first and second positions is measured, the optical device to be tested is a lens; said reflector means includes a flat mirror in front of and parallel to the lens to be tested and is moved with the optical device and auxiliary converging lens from said first position to said second position; and the lens power (P) of the optical device is determined by the following equation:

$$P = \Delta Z / f_0^2.$$

14. The method according to claim 9, wherein said optical measuring system is a deflectometer.

15. The method according to claim 9, wherein said optical measuring system is an interferometer.

16. Apparatus for measuring an optical property of an optical device, comprising:

an optical measuring system having means for measuring collimation of a beam received by said system;

a main converging lens having a focal length $f_1$ in front of said optical measuring system;

a carrier having an auxiliary converging lens for receiving a beam from the optical measuring system, and means, including the optical device to be tested, for reflecting back, via the auxiliary converging lens to the optical measuring system, the beam passed through the auxiliary converging lens from the optical measuring system;

means for locating said optical device to be tested in the front focal plane of the auxiliary converging lens;

and means enabling said carrier to be moved from a first position wherein the back focal plane of the auxiliary converging lens coincides with the front focal plane of the main converging lens, to a second position wherein the beam reflected back to the optical measuring system via the auxiliary converging lens and main converging lens is found by said optical measuring system to be collimated.

17. The apparatus according to claim 16, wherein said optical measuring system is a deflectometer.

18. The apparatus according to claim 16, wherein said optical measuring system is an interferometer.

* * * * *